March 2, 1943.　　　G. B. STILLWAGON, JR　　　2,312,601
SHUT-OFF VALVE
Filed Feb. 26, 1940　　　2 Sheets-Sheet 1
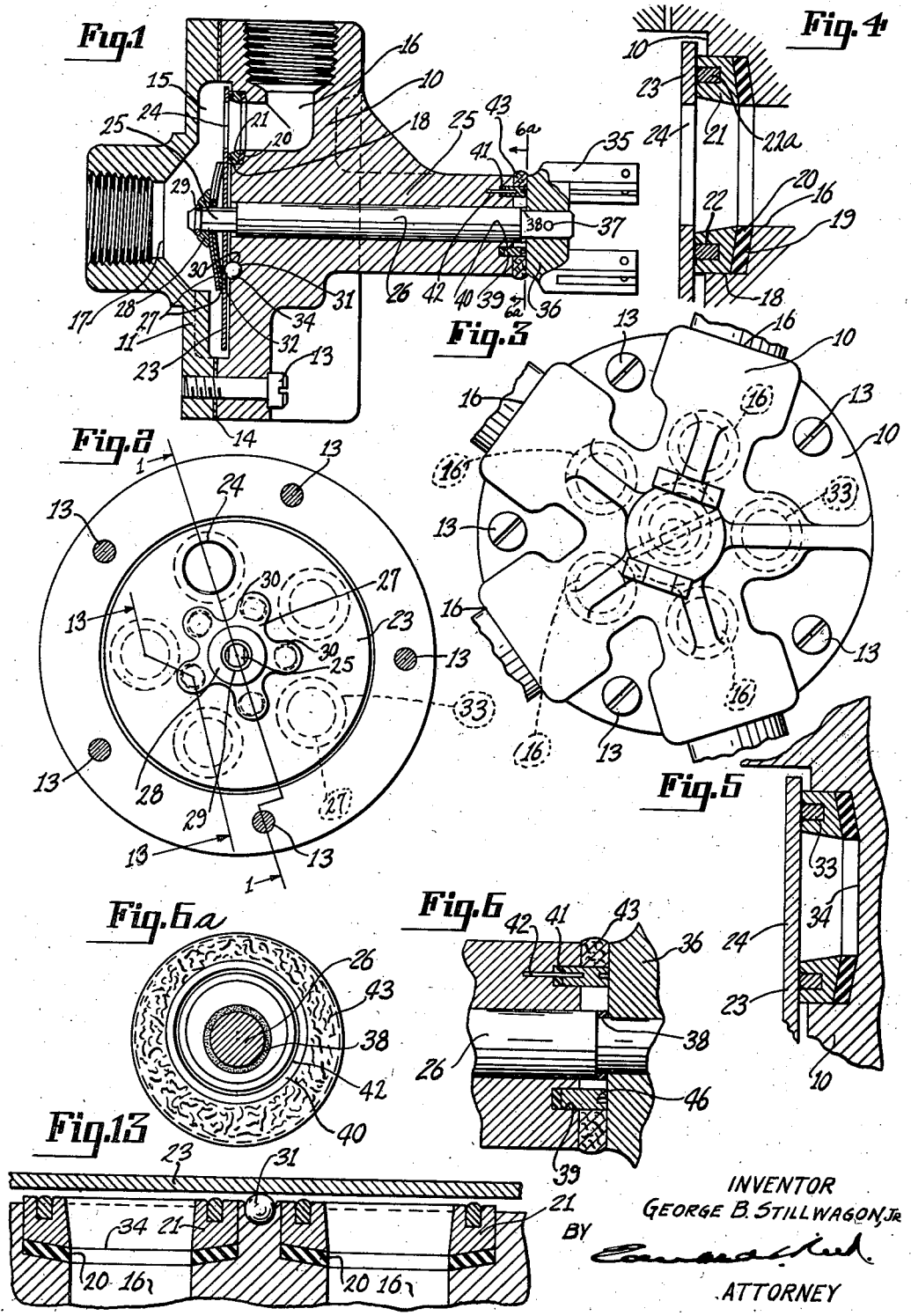
INVENTOR
GEORGE B. STILLWAGON JR.
BY
ATTORNEY March 2, 1943.  G. B. STILLWAGON, JR  2,312,601
SHUT-OFF VALVE
Filed Feb. 26, 1940   2 Sheets—Sheet 2
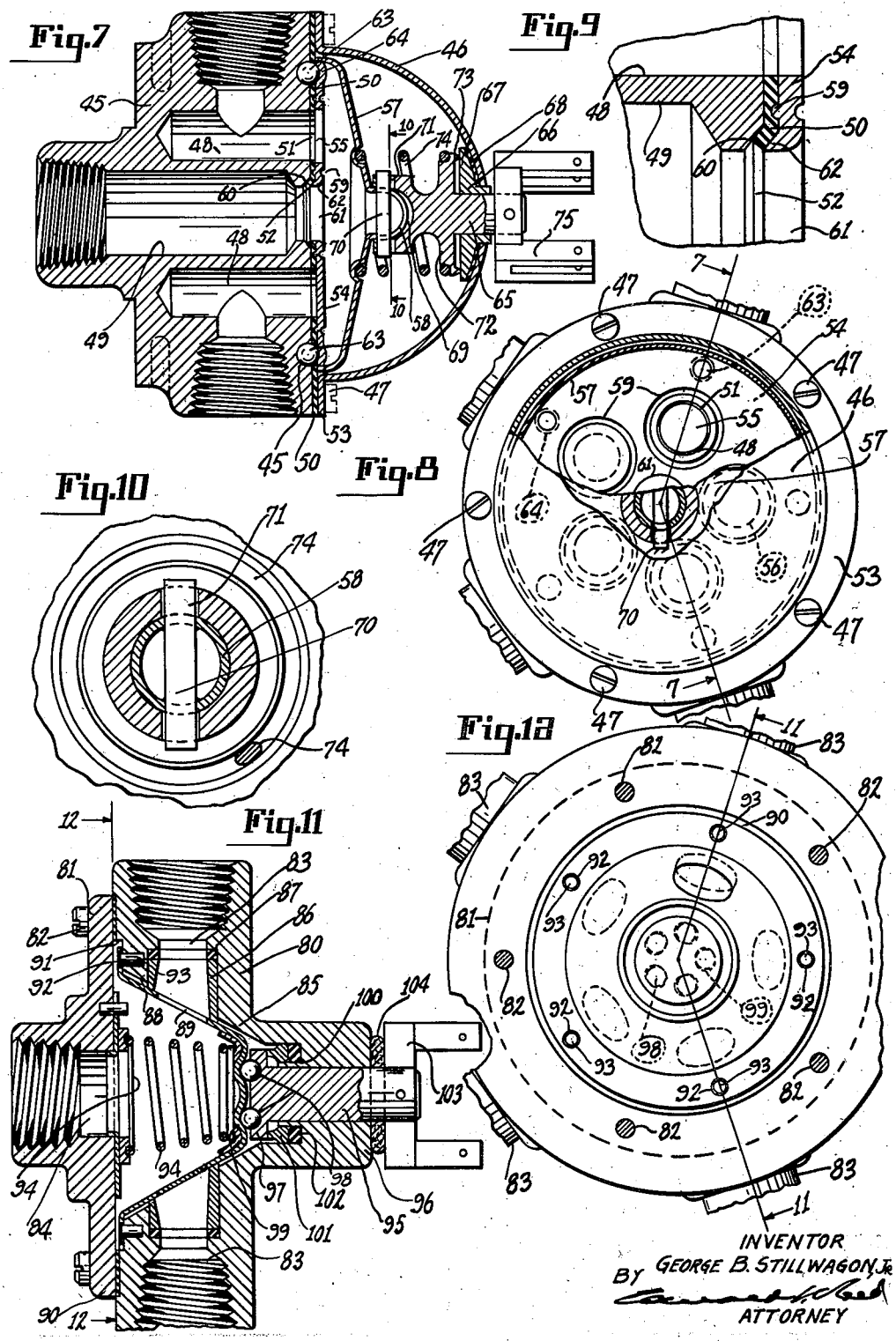
INVENTOR
GEORGE B. STILLWAGON, Jr.
BY
ATTORNEY Patented Mar. 2, 1943

2,312,601

UNITED STATES PATENT OFFICE 2,312,601

SHUTOFF VALVE

George B. Stillwagon, Jr., Dayton, Ohio, assignor of one-half to Kenneth G. Fraser, Dayton, Ohio Application February 26, 1940, Serial No. 320,804

16 Claims. (Cl. 251—90)

This invention relates to a shut-off valve and is designed primarily for use as a fuel valve for an internal combustion engine or the like.

One object of the invention is to provide a shut-off valve of simple construction which will effectively seal the inlet port or ports and will prevent leakage of fuel to the atmosphere; and which will be of light weight and easily operated from a remote point.

A further object of the invention is to provide such a valve with a movable flow controlling member which will be pressed firmly against the sealing member arranged about the inlet port, and with means for positively relieving that pressure during the initial movement of said member when the latter is moved from one position to the other.

A further object of the invention is to provide such a valve having a plurality of inlet ports with a rotatable valve member which presses firmly against the sealing members about the respective ports and with means for positively moving said inlet member axially during the initial rotation thereof to uniformly relieve the pressure thereof on said sealing members.

A further object of the invention is to provide such a valve with a sealing member for each inlet port of such a character that it can accommodate itself to the movable valve member in different positions of the latter.

A further object of the invention is to provide such a valve with means for locking the movable valve member in a predetermined position and for automatically releasing the same.

A further object of the invention is to provide such a valve in which an actuating shaft and its bearing are provided with cooperating sealing members and in which the means for pressing the movable valve member against the sealing member for the inlet port also serves to maintain the first mentioned sealing members in firm sealing contact one with the other.

Other objects of the invention may appear as the valve is described in detail.

In the accompanying drawings Fig. 1 is a longitudinal sectional view taken through a valve embodying my invention, on the line 1—1 of Fig. 2; Fig. 2 is a front elevation of the valve with the cap or end closure removed; Fig. 3 is a rear elevation of the valve; Fig. 4 is an enlarged sectional detail view of the sealing device for one of the inlet ports; Fig. 5 is an enlarged detail view of a support for the movable valve member in the space between two of said inlet ports; Fig. 6 is an enlarged sectional detail view of the sealing device for the shaft; Fig. 6a is a transverse section taken on the line 6a—6a of Fig. 1; Fig. 7 is a longitudinal sectional view of a modified form of the valve taken on the line 7—7 of Fig. 8; Fig. 8 is a rear elevation of the valve of Fig. 7, partly broken away; Fig. 9 is an enlarged sectional detail view of portions of the movable valve member and the sealing member about the inlet port; Fig. 10 is a section taken on the line 10—10 of Fig 7; Fig. 11 is a longitudinal section of another form of the valve taken on the line 11—11 of Fig. 12; Fig. 12 is a section taken on the line 12—12 of Fig. 11, looking in the direction of the arrows; and Fig. 13 is a detail section taken on the line 13—13 of Fig. 2, showing a slight modification of the valve.

In these drawings I have shown several embodiments of the invention for the purpose of illustrating a part of the various forms which the invention may take. In that embodiment of the invention illustrated in Figs. 1 to 6, the valve casing comprises a body portion 10 and a front cover or cap 11 rigidly secured to the body portion, as by means of screws 13, a suitable gasket 14 being interposed between opposed portions of the body and the cap. The opposed faces of the body portion and of the cap are recessed to provide between the same a flow chamber 15. The body portion may be provided with any suitable number of inlet ports 16, four being shown in the present valve, and being spaced radially from the longitudinal axis of the valve equal distances. They are also spaced equal distances one from the other except that the two end ports of the series of ports are spaced apart twice the distance between the other ports, to provide a neutral space as will hereinafter appear. Each of these inlet ports has its outer portion arranged radially in the body of the valve and its inner portion extending axially thereof and opening into the flow chamber 15. The end member or cap 11 is provided with an outlet port 17 leading from the flow chamber 15 and preferably arranged axially of the valve.

Each inlet port 16 is provided at its inner end with suitable means for sealing the same and in this embodiment of the invention a separate sealing member is provided for each inlet port. This sealing member projects slightly beyond the inner end of the inlet port and into the flow chamber where it contacts with a movable valve member, as will be hereinafter described, and is yieldably supported so that it may adjust itself with relation to the port and valve member. In the arrangement here illustrated the inlet port is provided at its inner end with an internal annular recess 18 which forms at its inner end a shoulder 19 sloping outwardly and toward the inlet port. Supported on this shoulder is a ring 20 of yieldable material which is impervious to the gasoline or other fluid with which the valve is to be used and may conveniently be formed of a synthetic rubber of the type commonly known as "duprene." Resting upon this yieldable ring is a sealing ring 21 of relatively hard material, such as a relatively soft metal, having an inclined surface contacting with the yieldable ring 20 and having its outer end projecting slightly beyond the face of the body portion 10 of the valve.

Mounted within the flow chamber adjacent the inner face of the body portion of the valve is a movable valve member which in the present instance is in the form of a flat disk 23 rotatable about the axis of the valve and having an opening 24 arranged to be moved by the rotation of the valve member into alinement with any one of the inlet ports or into the above mentioned neutral space. When the valve member is in any one of the aforesaid positions it has firm sealing contact with the several sealing members or rings 20. In the arrangement shown the contact between a sealing ring of hard material and the valve member will ordinarily effect a tight seal, but, if desired, the projecting edge of the valve ring may be provided with annular groove 22 and this groove filled with a relatively yieldable material 22a, such as synthetic rubber, which projects slightly beyond the edge of the ring for contact with the valve member but will yield under pressure of the valve member to permit the latter to have direct contact with the hard material of the ring. Preferably the outer edge portion of the yieldable material 22a is rounded and the roundel portion extends into the groove 22 so as to provide spaces on both sides thereof which will prevent shearing contact between the material 22a and the edge portions of the ring 20 during the movement of the valve member.

The valve member may be pressed against the sealing member in any suitable manner and in the construction here illustrated the body portion of the valve is provided with a relatively long bearing 25 and an actuating shaft 26 is journaled in this bearing with its inner end projecting into the flow chamber 15. The valve member or disk 23 is mounted on this projecting end of the shaft, the end portion of the shaft being of a non-circular shape and the valve member having a central opening of a similar shape so that the valve member will rotate with the shaft but can have a limited axial movement with relation thereto. It is also preferable that the opening in the valve member shall be sufficiently larger than the supporting portion of the shaft to permit a slight tilting movement of the valve member and thus enable the latter to automatically adjust itself to any slight unevenness of the sealing members. The valve member is pressed against the sealing members 21 for the several inlet ports by a yieldable device which may be of any suitable character but which preferably comprises a series of spring fingers 27 supported on the inner portion of the shaft beyond the valve member and held normally under compression so that they will exert a constant pressure on the valve member. These resilient fingers may, if desired, be separately mounted on the shaft or other suitable support but, in the present instance, they are formed in a single piece which is retained on the shaft by means of a washer 28 which in turn is secured to the shaft by a split ring 29. If desired, two or more sets of resilient fingers may be provided, so that in the event a finger of one set is broken the pressure on the valve member will still be distributed substantially equally.

To prevent undue wear on the sealing members and to avoid the possibility of small fragments of the sealing material being removed and finding their way into the carburetor service line of the engine it is desirable to relieve the pressure of the valve member on the sealing members during the rotation of the valve member. For this purpose I have interposed between the body of the valve and the valve member camming devices which during the initial rotation of the valve member from one position to the other will move the latter axially against the action of the springs 27 and thus relieve the pressure thereof on the sealing members. It is preferable, usually, that the valve member should not be moved entirely out of engagement with the sealing members but should have continuing light contact therewith. The yieldability of the sealing rings permits them to follow the valve member as the latter is moved axially and thus maintain such a light contact thereon, it being understood that the axial movement of the valve member is very small, and usually does not exceed one thirty-second of an inch. This camming means may take various forms and may be variously arranged. In this embodiment of the invention the body of the valve is provided in that face adjacent the valve member with a plurality of recesses 30 spaced equal distances apart and arranged in predetermined relation to the respective inlet ports. Mounted in these recesses are camming members 31 which project beyond the face of the body of the valve and contact with the adjacent side of the valve member 23, the latter being provided with a corresponding plurality of flared recesses 32 so arranged that when the opening 24 of the valve member is properly alined with any one of the inlet ports or is in its predetermined neutral position all the camming members 31 will lie in the recesses 32 of the valve member and the latter will be pressed firmly against the several sealing members for the inlet ports. The distance which the camming members project beyond the face of the body of the valve and the depth of the recesses 32 in the valve member are such that when the camming members are seated in the recesses 32 the valve member will be spaced a slight distance from the face of the body so that its pressure will be exerted entirely upon the sealing members. When the valve member is rotated from one position to another the initial movement thereof will cause the flared walls of the recesses 32 of the valve member to ride over the camming members 31 so as to impart sufficient axial movement to the valve member to relieve the pressure thereof on the several sealing members and the camming members will remain in contact with the flat face of the valve member until the latter has reached another predetermined position, with the opening 24 either in line with another inlet port or in its neutral position, at which time the camming members will again enter the recesses 32 and the springs will move the valve member toward the sealing members. For the purpose of reducing their frictional resistance to the movement of the valve member the cam members 31 are here shown as balls and preferably the recesses 30 in the body of the valve are substantially semi-spherical so as to permit the rotation of the balls in the recesses. It will be noted that the opening 24 in the valve member is of a diameter slightly less than the internal diameter of the projecting end portion of the sealing ring, thus permitting axial movement to be imparted to the valve member and the pressure relieved before the edge of the opening 24 contacts with the sealing ring.

As above stated, there is a relatively wide space between the end ports of the series of inlet ports in which space the opening 24 of the valve member lies when the valve is in its normal closed position. To prevent any tilting of the valve in this relatively wide space it is desirable to provide a support for that part of the valve member which is in that space and I have found that this can best be accomplished by mounting in the neutral space a sealing device 33 similar to the sealing devices for the inlet ports. As shown in Fig. 5, the body of the valve is provided with a blind recess 34 in which this sealing device 33 is mounted so that it contacts with the valve member in the same manner as do the sealing devices for the ports, thus preventing any tilting of or irregular wear on the valve member or other part of the valve.

In addition to imparting axial movement to the valve member the camming devices serve to index that member and the resistance to the movement of the valve member will indicate to the operator that the opening 24 in the valve member is alined with one of the inlet ports or is in its neutral position. If the manual rotation of the valve member is stopped after the camming members have entered the respective recesses therein but before they are fully seated in said recesses the pressure on the valve member will, due to the flared shape of the recesses therein, cause a further rotation of the valve member sufficient to fully seat the camming members in the recesses and thus accurately aline the opening 24 in the valve member with a selected inlet port, or its neutral position, and cause the valve member to have firm sealing contact with all the sealing members.

The actuating shaft 26 may be rotated in any suitable manner, but in many cases, particularly in the case of airplane installations, the valve is actuated from a remote point and in the present arrangement there is secured to the outer end of the shaft, which projects beyond the bearing 25, one member 35 of a coupling by means of which another shaft may be connected with the actuating shaft. This part of the coupling comprises a head 36 which is rigidly secured to the shaft, as by means of a pin 37, and I have utilized this head as a part of a sealing device to prevent the escape of gasoline or other fluid through the bearing 25 to the atmosphere. In the arrangement shown the shaft 26 is provided with a shoulder facing the inner surface of the head 36 and a packing of suitable impervious material 38 is interposed between the inner surface of the head and the shoulder. The end of the bearing 25 is provided with a groove extending about the shaft and in which is mounted a sealing member 40 which projects beyond the end of the bearing and contacts with the sealing surface of the head 36, which is preferably flat. If desired, a resilient washer 41 may be interposed between the sealing ring 40 and the base of the recess 39, and the sealing ring is preferably held against rotation, as by means of a pin 42. The sealing surface of the head 36 is held firmly in contact with the sealing ring 40 by the action of the springs 27 which press the valve member 23 against the sealing rings 21, it being apparent that the arrangement of these springs is such as to exert an inward thrust on the shaft. The sealing member 40 is preferably nonconcentric to the axis of the shaft so that during the rotation of the shaft it will have a wiping action over a relatively large portion of the sealing surface of the head 36 and thus prevent any tendency of the sealing member to wear a groove in that sealing surface. This sealing member 40 is here shown as an eccentrically arranged ring but it may be of any suitable shape. I also prefer to interpose between the end of the bearing and the head 36, on the outer side of the sealing ring 40, a ring of absorbent material, such as felt, which is held under pressure by contact with the head and the bearing. Any liquid which may escape through the bearing and work its way past the sealing ring 40 will be absorbed by this felt ring and dispersed throughout the same so that it will evaporate from the surface thereof and will not form in drops or leave the sealing device in a liquid form. This felt ring also serves to prevent the entrance of moisture or other extraneous matter into the seal and, if desired, it may be impregnated with a lubricant to lubricate the contacting parts of the seal.

In that embodiment of the invention illustrated in Figs. 7 to 10, the valve casing comprises a body portion 45 and a dome-shaped end member or housing 46 which is rigidly secured to the body, as by screws 47. The body may be provided with any suitable number of inlet ports and, in the present instance, I have shown four such ports at 48, each inlet port comprising a radial portion and an axial portion which opens through the rear face of the body of the valve. The body of the valve is also provided with a forwardly extending axially arranged outlet port 49 which opens through the rear face of the body. The sealing means for the inlet ports in this instance comprises a gasket 50 which extends across the face of the body of the valve and is provided with openings 51 in line with the inlet ports and with an opening 52 in line with the outlet port. In the present instance this gasket also extends between the body of the valve and the flange 53 of the dome-shaped housing 46. The movable valve member is in the form of a disk 54 bearing against the gasket 50 and rotatable to move an opening 55 therein into line with any one of the inlet ports 48 or into a neutral position, as shown at 56 in Fig. 8. This valve member is supported by a hollow structure or shell 57 which is rigidly secured to the valve member 54 near the peripheral edge thereof in any suitable manner, as by welding or brazing the same thereto. This shell has at its outer end a portion 58 adapted to be connected with an actuating device whereby rotatory movement may be imparted to the shell and to the valve member. The shell being hollow and thus spaced from the valve member there is formed between the valve member and the shell a flow chamber through which fluid may flow from an open inlet port to the outlet port. The sealing member 54 is pressed firmly against the gasket 50 by yieldable means, as will be hereinafter described, and in order to secure a very tight seal about each inlet port the valve member is provided with a series of annular ribs or beads 59, one of those annular ribs being arranged about the opening 55 and the others being so positioned that when the opening 55 is in line with any one of the inlet ports or is in its neutral position said other annular ribs will engage the gasket about the respective closed inlet ports. The pressure on the valve member presses these annular ribs into the gasket so as to provide a very effective seal. At the inner end of the outlet port 49 the body of the valve is provided with a beveled shoulder 60 across which the edge of the gasket 50 extends. The valve member 54 is of course provided with a central opening 61 in line with the outlet port and the edge of the valve member about this central opening is turned inwardly, as shown at 62, to press the edge of the gasket firmly into contact with the shoulder 60. In order to relieve the pressure of the valve member on the gasket or sealing member and to withdraw the annular ribs from the depressions formed thereby in the gasket, means are provided for moving the valve member axially against the action of the means which presses it against the gasket. This means is substantially the same as that shown in the embodiment of Figs. 1 to 6 and it comprises a plurality of balls 63, or the like, seated in the body portion 45 of the valve and projecting through openings in the gasket 50 to contact with the valve member, the latter being provided with recesses 64 to receive the balls and to cooperate therewith in camming the valve member axially during the initial rotation thereof.

The means for rotating the shell 57 and the valve member 54 is here shown as a shaft 65 rotatably mounted in a bearing 66 mounted in the dome-shaped housing 46, held against rotation therein and having within the housing a flange 67 shaped to conform to the interior contour of the dome-shaped housing, a sealing element 68 being interposed between the flange and the closure. The shaft 65 is provided at its inner end with an axial recess 69, preferably having a semi-spherical base portion, and the part 58 of the shell 57 extends into this recess and is secured thereto, as by a pin 70 extending through the part 68 of the shell and through slots 71 in the recessed portion of the shaft 65. The pin is rigidly secured in the part 58 of the shell and the projecting ends thereof are slidably mounted in the slots 71 so that they may have a limited movement lengthwise of the shaft, thus permitting the axial movement of the valve member toward and from the gasket. The shaft is provided adjacent the bearing 66 with a circumferential flange 72 having near its peripheral edge an annular sealing member 73 which bears against the face of the flange 67 and thus provides a seal between the bearing and the interior of the dome-shaped housing. A spring 74 confined between the flange 72 and the shell 57 serves both to press the valve member against its gasket and to press the sealing member 73 against the sealing surface of the flange 67. The shaft may be rotated in any suitable manner and is shown as having secured thereto a part 75 of a coupling.

In Figs. 11 and 12 there is illustrated another embodiment of the invention in which means are provided for locking the valve member in predetermined positions, for automatically releasing the same during the initial movement of the actuating member and for imparting rotation thereto by the continued movement of the actuating member. The mechanism for accomplishing this result may take various forms, the form at present preferred being that illustrated. In the form illustrated the valve casing comprises a body portion 80 and an end closure or cap 81 secured to the body portion by screws 82. The body portion is provided with a plurality of inlet ports 83 which in this instance are radial throughout their length, and the end member 81 is provided with an axial outlet port 84. The body portion 80 is recessed to provide the same with a relatively deep frusto-conical chamber 85 into which the inlet ports open. Each inlet port is provided with a sealing ring 86 supported on a yieldable ring 87, the arrangement being substantially that above described except that the inner end of the sealing ring 86 is inclined to conform it to the inclined surface of the frusto-conical chamber. Mounted within the frusto-conical chamber and shaped to conform thereto is a frusto-conical valve member 88 having an opening 89 adapted to be moved into alinement with any one of the inlet ports 83 by the rotation of the valve member. The valve member is provided at its forward or larger end with a flange 90 which extends into a circumferential recess 91 formed between the body of the valve and the end closure 81, and this flange is provided with openings 92 arranged to receive locking studs 93 which project from the body of the valve into the recess 91. There is preferably a locking stud adjacent each inlet port and adjacent the neutral position of the opening 89 in the valve member, and the valve member 88 is provided with a corresponding number of openings so arranged that they will be in line with the corresponding studs when the opening 89 of the valve member is in any one of the aforesaid positions. The valve member is capable of axial movement sufficient to disengage it from the locking studs and any suitable means may be provided for interrupting this axial movement after the valve member has cleared the studs. The recesses in which the camming members operate may be shaped to so limit the movement of the valve member, or, in the arrangement illustrated, that wall of the recess 91 opposite the studs may serve as a stop to interrupt the axial movement of the valve member after it has been disengaged from the studs and is free to rotate. A spring 94 is confined between the end closure 81 and the smaller end of the frusto-conical valve member, which end is preferably closed, and serves to move the valve member into locking engagement with the studs and to press the same against the several sealing rings 86.

An actuating shaft 95 is journaled in a bearing 96 formed in the body of the valve beyond the smaller end of the valve member. At its inner end this shaft is provided with cam means acting on the valve member to first move the same axially to release it from the locking studs and to then rotate the same. As here shown, the inner end of the shaft is provided with an enlarged end portion 97 having in the inner face thereof a plurality of recesses flared in the direction of rotation and in which are seated balls 98 which project beyond the inner face of the shaft and bear against the closed end of the valve member. There may be any suitable number of balls and in the form illustrated there is one ball for each normal position of the valve member, that is, for each of the inlet ports and for the neutral position of the valve member. The closed end of the valve member is provided with a corresponding number of recesses 99 adapted to receive the balls and of such depth that the balls will remain in the recesses in all positions of the valve member. The recesses are so arranged that when the openings 92 in the flange of the valve member are in engagement with the respective locking studs 93 the balls will be seated in the bottoms of the recesses 99. Inasmuch as the valve member is thus locked against rotation the first rotation of the shaft 95 will cause the balls to ride upwardly on the inclined surfaces of the recesses 99, and the shaft being held against substantial axial movement, the balls will move the valve member axially to disengage the same from the locking studs. When this disengagement has been effected the further axial movement of the valve member is prevented by its contact with the outer wall of the recess 91 and the contact of the balls 98 with the outer portions of the recesses will cause the valve member to rotate with the shaft 95 during the continued rotation of the shaft until the valve member has been moved to the desired position and the rotation of the shaft 95 interrupted.

The bearing portion of the body 80 of the valve is provided with an annular recess 100 arranged about the shaft 95 and a sealing member 101 is mounted in this recess in contact with the outer side of the flange 97 of the shaft. This sealing member is supported by a yieldable ring 102 mounted in the bottom of the recess. The shaft is provided at its outer end with means for rotating the same, as shown at 103, and a sealing member 104 is interposed between the rotating member 103 and the bearing 96.

In the several forms of valve herein illustrated the arrangement is such that the axial movement of the valve member is just sufficient to relieve the pressure thereof on the sealing members while maintaining a light contact between the valve member and the sealing members, but it is not essential that the movement of the valve be so limited. In some installations it may be desirable to move the valve member out of contact with the sealing members and this can be accomplished by merely increasing the throw of the camming devices, as shown in Fig. 13, where the camming device or ball 31a is shown as projecting beyond the body portion of the valve a distance sufficient to move the valve member out of contact with the sealing members 21 and thus connect the inlet ports one with the other. For example, with some airplane installations each inlet port would be connected with a separate fuel tank and a part at least of these tanks will be located in the wings of the airplane. In order to maintain the airplane in balance it is desirable that the fuel in the several tanks should be maintained at approximately the same level. When the fuel in one tank has been partially exhausted the simultaneous opening of all the inlet ports will connect said ports one with the other and permit the fuel from the full tanks to flow into the partially exhausted tank and to assume approximately a common level in all the tanks. The inlet ports will be momentarily connected one with the other whenever the valve member is moved from one position to another position and to equalize the fuel level in the several tanks it is only necessary to retain the valve member in an intermediate position for a brief interval. Another advantage of being able to simultaneously open all the inlet ports is that in the case of a fuel shortage it permits the small residues of fuel in all the tanks to be utilized.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a valve, a casing having a plurality of inlet ports and an outlet port, sealing means arranged about said inlet ports, a valve member mounted in said casing for rotary movement and for axial movement and having an opening in constant communication with said outlet port, said opening being arranged normally in an inoperative position to close said valve and being movable by the rotation of said valve member from said inoperative position into an operative position in line with any one of said inlet ports, yieldable means for moving said valve member axially to press the same against said sealing means, means for rotating said valve member, and means controlled by said rotating means for moving said valve member axially against the action of said yieldable means to relieve the pressure thereof on said sealing means during the rotation thereof from one of said positions to another of said positions, said sealing means being yieldable to maintain the same substantially in contact with said valve member when the pressure of the latter thereon has been relieved.

2. In a valve, a casing having a plurality of inlet ports and an outlet port, a valve member mounted in said casing for rotary movement and for axial movement and having an opening in constant communication with said outlet port, said opening being arranged normally in an inoperative position with relation to said inlet ports and being movable by the rotation of said valve member from said inoperative position to an operative position in line with a selected inlet port, a sealing member arranged about each inlet port and yieldable lengthwise of said port, yieldable means for moving said valve member axially to press the same against said yieldable sealing members, and means for rotating said valve member and for moving the same axially to relieve the pressure thereof on said sealing members and permit the latter to move in the direction of the axial movement of said valve member.

3. In a valve member, a casing having a plurality of inlet ports and an outlet port, sealing means arranged about said inlet ports, an actuating device rotatably supported by and extending into said casing, a valve member connected with said actuating device for rotation therewith and for axial movement with relation thereto and having an opening movable by the rotation of said valve member into operative positions in line with the respective inlet ports, said casing and said actuating device having parts cooperating to seal the connection between the same, a yieldable device acting on said valve member and on said actuating device to press said valve member against the sealing means for said inlet ports and to press the sealing part of said actuating member against the sealing part of said casing, and means controlled by the rotation of said actuating device for moving said valve member against the action of said yieldable device to relieve the pressure of said valve member on said sealing means while maintaining said parts of said actuating device and said casing in sealing engagement.

4. In a valve, a casing having a plurality of inlet ports, an outlet port and a bearing, sealing means arranged about said inlet ports, a shaft mounted in said bearing, a valve member connected with said shaft for rotation therewith and for axial movement with relation thereto, said valve member having an opening movable by the rotation thereof into an inoperative position and from said inoperative position into operative positions in line with the respective inlet ports, said bearing and said shaft having cooperating parts to seal said bearing, a spring acting on both said valve member and said shaft to press said valve member against the sealing means for said inlet ports and to press the sealing part of said shaft against the sealing part of said bearing, and camming means controlled by the rotation of said shaft for moving said valve member against the action of said spring to relieve the pressure of said valve member on said sealing means and to increase the pressure of the sealing part of said shaft on the sealing part of said bearing.

5. In a valve, a casing having an inlet port, an outlet port and a bearing, sealing means arranged about said inlet port, a shaft mounted in said bearing, a valve member connected with said shaft for rotation therewith and for axial movement with relation thereto, and having an opening movable by the rotation thereof into and out of alinement with said inlet port, an annular sealing member mounted in and projecting beyond one end of said bearing and arranged eccentrically to the axis of said shaft, a sealing member secured to said shaft and engaging said annular sealing member, a yieldable device for pressing said valve member against the sealing means for said inlet port and for pressing the sealing member on said shaft against the annular sealing member on said bearing, and means controlled by the rotation of said shaft for moving said valve member against the action of said yieldable device to relieve the pressure thereof on said sealing means while said yieldable device continues to press the sealing member on said shaft against said annular sealing member.

6. In a valve, a casing having an inlet port, an outlet port and a bearing, a sealing member arranged about said inlet port, a shaft journaled in said bearing, a valve member connected with said shaft for rotation thereby and for axial movement with relation thereto and having an opening movable into and out of alinement with said inlet port, said bearing having in one end thereof an annular recess extending about said shaft, an annular sealing member mounted in said recess, a member secured to said shaft adjacent said end of said bearing and having a sealing surface engaging said annular sealing member, and a spring confined between said shaft and said valve member to press said valve member against said sealing member for said inlet port and to press the sealing member on said shaft against said annular sealing member.

7. In a valve, a casing having an inlet port, an outlet port and a bearing, a valve member rotatably supported in said casing between said ports and having an opening movable into and out of alinement with said inlet port, a shaft rotatable in said bearing and operatively connected with said valve member, a part carried by said shaft and having a sealing surface adjacent one end of said bearing, said bearing having in said end a non-concentric annular recess, a sealing ring mounted in said recess and extending beyond the end of said bearing to engage the sealing surface of said part of said shaft, and yieldable means acting on said shaft to press said part thereof against said sealing ring.

8. In a valve, a casing having an inlet port and an outlet port and having a recess surrounding said inlet port, a sealing member mounted in said recess for movement lengthwise of said port, a valve member mounted in said casing for rotary movement and for axial movement and having an opening movable by the rotation of said valve member into and out of alinement with said inlet port, yieldable means for moving said valve member axially to press the same against said sealing member, means to yieldably support said sealing member against the pressure of said valve member, means for rotating said valve member, and means controlled by said rotating means for moving said valve member axially to relieve the pressure thereof on said sealing member, said supporting means causing said sealing member to follow said valve member as the latter moves in pressure relieving direction.

9. In a valve, a casing having an inlet port and an outlet port, a valve member mounted in said casing for rotary movement and for axial movement and having an opening movable into and out of alinement with said inlet port, said inlet port having an internal shoulder spaced from the inner end thereof, a ring of yieldable material supported on said shoulder, a sealing ring of hard material supported by said yieldable ring for movement lengthwise of said inlet port, yieldable means for moving said valve member axially to press the same against said sealing ring, means for rotating said valve member, and means controlled by said rotating means for moving said valve member axially to relieve the pressure thereof on said sealing ring, said yieldable material on which said sealing ring is supported serving to seal the joint between said sealing ring and the wall of said port and to press said sealing ring into contact with said rotatable valve member when the latter is in pressure relieving position.

10. In a valve, a casing having an inlet port and an outlet port, a sealing ring arranged about and adapted to project beyond the inner end of said inlet port, a valve member mounted in said casing for rotary movement and for axial movement and having an opening movable by the rotation thereof into and out of alinement with said inlet port, yieldable means for pressing said valve member axially against said sealing ring, means for rotating said valve member, and means controlled by the initial rotation of said valve member for moving the latter axially against the action of said yieldable means to relieve the pressure thereof on said sealing ring, the opening in said valve member being of a diameter less than the diameter of the contacting portion of said sealing ring so that the edge of said opening will not engage said sealing ring until the pressure of said valve member thereon has been relieved.

11. In a valve, a casing having a plurality of inlet ports and an outlet port, sealing means arranged about said inlet ports, a valve member mounted in said casing for rotary movement and for axial movement and having an opening movable by the rotation of said valve member into alinement with said inlet ports successively to control the flow from said inlet ports to said outlet port, spring means for moving said valve member axially to press the same against said sealing means, a rotatable actuating member, and means controlled by the rotation of said actuating member to rotate said valve member and to move the same axially against the action of said spring means to relieve the pressure thereof on said sealing means during the rotation thereof to move said opening from one inlet port to another inlet port, said sealing means being yieldable to maintain the same substantially in contact with said valve member when the pressure of the latter thereon has been relieved.

12. In a valve casing having a substantially frustoconical chamber and provided in the circumferential wall of said chamber with a plurality of inlet ports and having at the larger end of said chamber an outlet port, sealing means arranged about said inlet ports, a hollow substantially frustoconical valve member mounted in said chamber for both rotary and axial movement with relation thereto and having an opening in the circumferential wall thereof movable by the rotation of said valve member into alinement with any one of said inlet ports, said valve member having its smaller end closed and its larger end in open communication with said outlet port, yieldable means for moving said valve member axially to press the same against said sealing means, a shaft rotatably mounted in said casing in line with and rotatable with relation to the closed end of said valve member, and means actuated by said shaft and acting on said closed end of said valve member to rotate the latter and to move the same axially against the action of said yieldable means to relieve the pressure thereof on said sealing means during the rotation of said valve member.

13. In a valve casing having a substantially frustoconical chamber and provided in the circumferential wall of said chamber with a plurality of inlet ports and having at the larger end of said chamber an outlet port, sealing means arranged about said inlet ports, a hollow substantially frustoconical valve member mounted in said chamber for both rotary and axial movement with relation thereto and having an opening in the circumferential wall thereof movable by the rotation of said valve member into alinement with any one of said inlet ports, said valve member having its smaller end closed and its larger end in open communication with said outlet port, yieldable means for moving said valve member axially to press the same against said sealing means, said casing having a bearing in line with the closed end of said valve member, a shaft rotatable in said bearing, said closed end of said valve member being provided with surfaces inclined in the direction of its rotation, and means carried by said shaft and acting on said inclined surfaces to impart axial movement to said valve member against the action of said yieldable means and to thereafter rotate said valve member, said shaft and said bearing having opposed parts arranged to be pressed one against the other by said yieldable means to seal said bearing.

14. In a valve, a casing having an inlet port and an outlet port, sealing means arranged about said inlet port, a valve member mounted in said casing for rotary movement and for axial movement and having an opening movable by the rotation thereof into and out of alinement with said inlet port, yieldable means for pressing said valve member against said sealing means, said valve member and said casing having cooperating parts to lock said valve member against rotation when the latter is pressed against said sealing means, and an actuating device rotatably mounted in said casing substantially in axial alinement with said valve member and having at its inner end camming devices, said valve member having in that side thereof adjacent said actuating device a plurality of cam surfaces spaced apart about the axis thereof and pressed against said camming device by said yieldable means, said cam surfaces being so arranged with relation to said camming devices that the initial rotation of said actuating device from its normal position will impart axial movement to said valve member to relieve the pressure thereof on said sealing means and disengage said locking parts and during the continued rotation of said actuating member said camming devices will remain in engagement with said cam surfaces and rotate said valve member and prevent the re-engagement of said parts.

15. In a valve, a casing having an inlet port and an outlet port, sealing means arranged about said inlet port, a valve member mounted in said casing for rotary movement and for axial movement and having an opening movable by the rotation thereof into and out of alinement with said inlet port, yieldable means for pressing said valve member against said sealing means, said valve member and said casing having cooperating parts to lock said valve member against rotation when the latter is pressed against said sealing means, and an actuating device rotatably mounted in said casing substantially in axial alinement with said valve member and having at its inner end camming devices, said valve member having in that side thereof adjacent said actuating device a plurality of cam surfaces spaced apart about the axis thereof and pressed against said camming device by said yieldable means, said cam surfaces being so arranged with relation to said camming devices that the initial rotation of said actuating device from its normal position will impart axial movement to said valve member to relieve the pressure thereof on said sealing means and disengage said locking parts, and means in addition to said yieldable means to check the axial movement of said valve member after said locking parts have been disengaged and while said camming devices are in engagement with said cam surfaces and thereby cause said valve member to be rotated by the continued movement of said actuating device.

16. In a valve, a casing having a substantially frustoconical chamber, lateral inlet ports leading to said chamber, sealing means about said inlet ports, and an outlet port at the larger end of said chamber, a substantially frustoconical hollow valve member mounted in said chamber for rotation and axial movement therein, having its smaller end closed and its larger end open and having an opening movable by the rotation of said valve member into alinement with any one of said inlet ports, an actuating device rotatably mounted in said casing substantially in axial alinement with said valve member, camming devices carried by the inner end of said actuating device and engaging the closed end of said valve member, yieldable means to press said valve member against said sealing means and said camming devices, said closed end of said valve member having cam surfaces cooperating with said camming devices to impart axial movement to said valve member upon the initial rotation of said actuating device and to rotate said valve member upon the continued rotation of said actuating device, and means controlled by the axial movement of said valve member for locking the same against rotation while it is pressed against said sealing means.

GEORGE B. STILLWAGON, Jr.